United States Patent [19]

Postle et al.

[11] 4,294,916
[45] Oct. 13, 1981

[54] PHOTOGRAPHIC SILVER HALIDE MATERIAL CONTAINING A DYE FILTER OR A DYE ANTI-HALATION LAYER

[75] Inventors: Stephen R. Postle, Brentwood; Alexander Psaila, Chelmsford, both of England

[73] Assignee: Ciba-Geigy AG, Basel, Switzerland

[21] Appl. No.: 145,174

[22] Filed: Apr. 30, 1980

[30] Foreign Application Priority Data

May 22, 1979 [GB] United Kingdom .............. 17692/79

[51] Int. Cl.³ .............................................. G03C 1/84
[52] U.S. Cl. .................................. 430/522; 430/591; 430/592; 430/594
[58] Field of Search ................ 430/522, 591, 592, 594

[56] References Cited

U.S. PATENT DOCUMENTS

| | | | |
|---|---|---|---|
| 3,471,293 | 10/1969 | Öhlschläger et al. .................. | 96/84 |
| 3,480,436 | 11/1969 | Wilson ..................... | 96/84 |
| 3,481,927 | 12/1969 | Heseltine et al. .................. | 430/522 |
| 3,540,888 | 11/1970 | Mee ..................... | 430/522 |
| 3,560,214 | 2/1971 | Ruda ..................... | 96/84 |

FOREIGN PATENT DOCUMENTS

| | | | |
|---|---|---|---|
| 2520834 | 11/1975 | Fed. Rep. of Germany ...... | 430/591 |
| 2639366 | 3/1977 | Fed. Rep. of Germany ...... | 430/522 |
| 1278621 | 6/1972 | United Kingdom ................ | 430/522 |
| 1338799 | 11/1973 | United Kingdom . | |
| 2002916 | 2/1979 | United Kingdom . | |

*Primary Examiner*—Mary F. Downey
*Attorney, Agent, or Firm*—Sprung, Felfe, Horn, Lynch & Kramer

[57] ABSTRACT

A photographic silver halide material is provided which comprises in at least one layer a solid dispersion of at least one water-insoluble methine dye of the formula

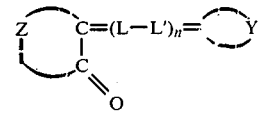

wherein L and L' each represent an optionally substituted methine group, n is 0, 1 or 2, Z represents the atoms necessary to complete an optionally substituted acidic carbocyclic or heterocyclic ring, Y represents the atoms necessary to complete an optionally substituted basic carbocyclic or heterocyclic ring, at least one of the rings Z and Y being substituted by a —COOH group or being substituted by a group which comprises a —COOH group. The solid dispersion of the dye is finely divided in the binder material of said layer, which is normally a filter or anti-halation layer. A marked increase of sharpness of the images obtained from photographic material containing in at least one layer the solid dyestuff dispersion can be observed.

8 Claims, 1 Drawing Figure

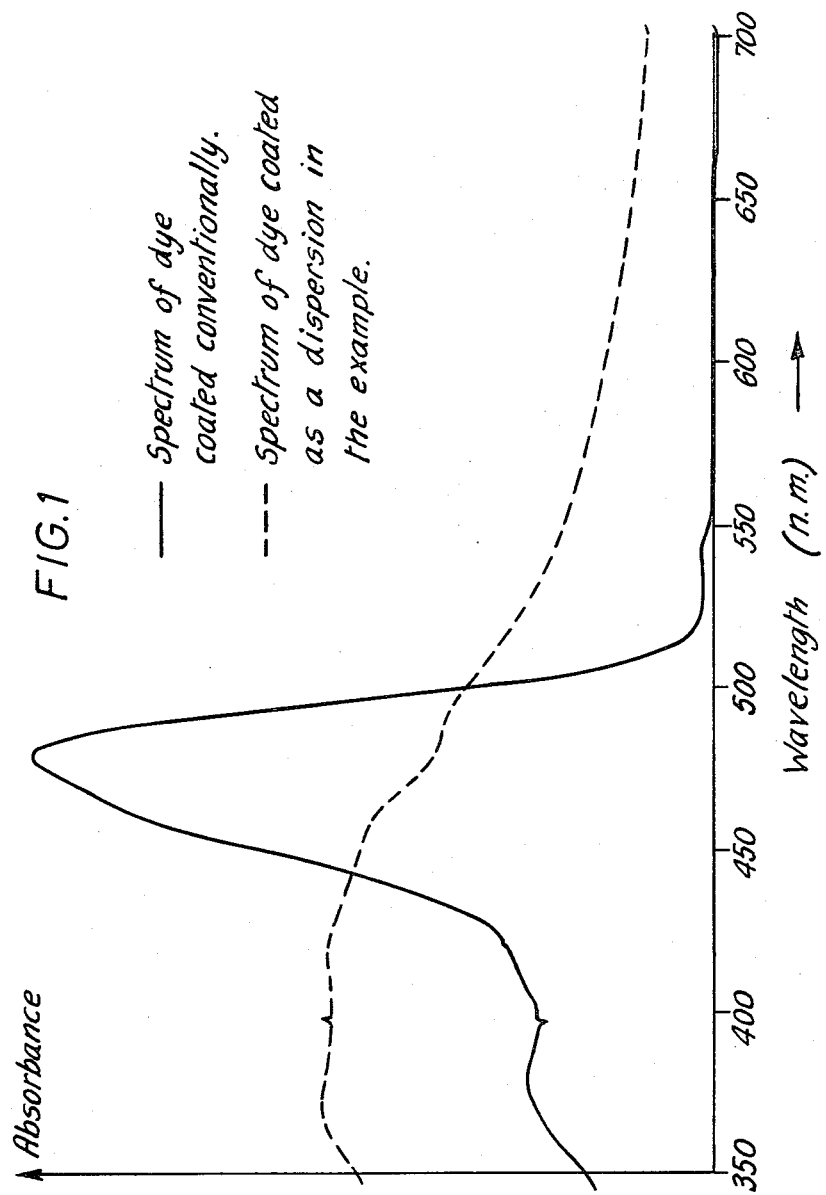

PHOTOGRAPHIC SILVER HALIDE MATERIAL CONTAINING A DYE FILTER OR A DYE ANTI-HALATION LAYER

The present invention relates to photographic silver halide material which contains either a dye filter layer or a dye anti-halation layer.

Dyes used either in filter layers or anti-halation layers and in particular in anti-halation underlayers in photographic material must be substantive to the layer in which they are coated and must be readily bleachable. Also in the case of anti-halation dyes they should have as wide a spectral absorption as possible.

We have found that a certain class of dyes when present as a solid dispersion in a layer in the photographic material are of great use as filter or anti-halation dyes.

Therefore according to the present invention there is provided photographic silver halide material which comprises in at least one layer a solid dispersion of at least one water-insoluble dye of the formula

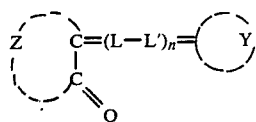
(1)

wherein L and L' each represent an optionally substituted methine group, n is 0, 1 or 2, Z represents the atoms necessary to complete an optionally substituted acidic carbocyclic or heterocyclic ring, Y represents the atoms necessary to complete an optionally substituted basic carbocyclic or heterocyclic ring, at least one of the rings Z and Y being substituted by a —COOH group or being substituted by a group which comprises a —COOH group, in a binder.

By basic heterocyclic or carbocyclic ring is meant an electron donating heterocyclic or carbocyclic ring. By acidic heterocyclic or carbocyclic ring is meant an electron accepting heterocyclic or carbocyclic ring. These terms are discussed in "Special Topics in Heterocyclic Chemistry" edited by A. Weinberger and E. C. Taylor, published by John Wiley—Interscience, New York, 1977. See chapter VIII, Synthesis and properties of cyanine and related dyes, by D. M. Sturmer, pages 455–460.

Examples of basic heterocyclic and carbocyclic rings are benzimidazole, benzoxazole, indole, lepidinole and quinole, further benzthiazole and benzselenazole.

Examples of acidic heterocyclic and carbocyclic rings are barbiturate, thiobarbiturate, dimedone and indan-1,3-dione.

Preferably in the dye of formula (1) n is 1 or 2 and L and L' are both —CH=.

Most preferably Z represents the atoms necessary to complete a substituted hydroxypyridone ring or a substituted pyrazolone ring.

Therefore according to one preferred embodiment of the invention there is provided photographic silver halide material which comprises in at least one layer a solid dispersion of at least one water-insoluble pyridone dye of the formula

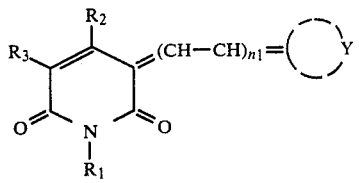
(2)

where $n_1$ is 1 or 2 and Y has the meaning assigned to it above, $R_1$ represents a hydrogen atom or an optionally substituted alkyl, aralkyl, cycloalkyl, aryl or heterocyclic radical or an optionally substituted amino group, $R_2$ represents a hydrogen atom or a hydroxy, amino, —CN, —COOR$^1$, —CONR$^1$R$^2$ or —COR$^1$ group or an optionally substituted alkyl, aralkyl, cycloalkyl, aryl or heterocyclic radical, and $R_3$ represents a hydrogen atom or a —CN, —COOR$^3$, —CONR$^3$R$^4$, —SO$_3$H, —SO$_3^\ominus$ or —COR$^3$ group, where R$^1$, R$^2$, R$^3$ and R$^4$ each independently represent a hydrogen atom or an optionally substituted alkyl, aralkyl, cycloalkyl, aryl or heterocyclic radical, at least one of the hydroxypyridone or Y rings being substituted by a —COOH group or a group which comprises a —COOH group, in a binder.

Throughout the specification the terms lower alkyl and substituted lower alkyl are used to denote alkyl moieties containing from 1 to 6 carbon atoms.

The optionally substituted alkyl radicals represented by $R_1$ and $R_2$ and R$^1$, R$^2$, R$^3$ and R$^4$ are alkyl radicals or substituted alkyl radicals, and as specific examples of such radicals there may be mentioned methyl, ethyl, n-propyl, n-butyl, n-octyl, n-decyl and n-dodecyl, hydroxy lower alkyl such as β-hydroxyethyl, lower alkoxy alkyl such as β-(methoxy or ethoxy)-ethyl and γ-methoxypropyl, cyanomethyl, carbamoylmethyl, carboethoxymethyl and acetylmethyl. The lower alkyl radicals and substituted lower alkyl radicals are preferred.

As examples of aralkyl radicals represented by $R_1$, $R_2$, R$^1$, R$^2$, R$^3$ and R$^4$ there may be mentioned benzyl and β-phenyl ethyl.

As an example of a cycloalkyl radical represented by $R_1$, $R_2$, R$^1$, R$^2$ R$^3$ and R$^4$ there may be mentioned cyclohexyl. The optionally substituted aryl radicals represented by $R_1$, $R_2$, R$^1$, R$^2$, R$^3$ and R$^4$ are preferably phenyl or optionally substituted phenyl radicals, and as specific examples of such radicals there may be mentioned phenyl, tolyl, chlorophenyl, methoxyphenyl and ethoxyphenyl. The optionally substituted heterocyclic radicals represented by $R_1$, $R_2$, R$^1$, R$^2$, R$^3$ and R$^4$ are preferably 5- and 6-membered heterocyclic rings and as specific examples of such radicals there may be mentioned 2-pyridyl, 2-thiazolyl, 1-piperidinyl and 1-morpholinyl, each of which may be substituted.

According to a particular embodiment of the invention there is provided photographic silver halide material which comprises in at least one layer a solid dispersion of at least one water-insoluble pyrazolone dye of the formula

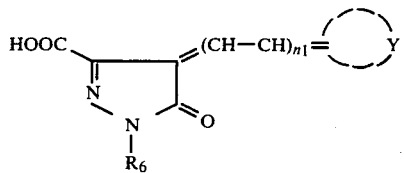

where $n_1$ and Y have the meanings assigned to them above and $R_6$ is a hydrogen atom or an optionally substituted alkyl or aryl group, preferably alkyl of 1 to 4 carbon atoms or phenyl.

According to another embodiment of the invention there is provided photographic silver halide material which comprises in at least one layer a solid dispersion of at least one water-insoluble dye of the formula

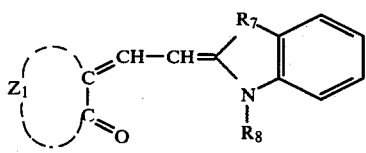

where Z is either a hydroxypyridone ring as defined with reference to formula (2) or a pyrazolone ring as defined with reference to formula (3), $R_7$ is either —O—, —S—, —Se—, or —$CR_9R_{10}$— where $R_9$ and $R_{10}$ are each hydrogen atoms or lower alkyl groups, or —$NR_{11}$ where $R_{11}$ is a hydrogen atom or a lower alkyl group, $R_8$ is a hydrogen atom, a lower alkyl group or a —COOH group, there being at least one —COOH group present, in a binder. Preferably $R_7$ is —O—, —$CR_9R_{10}$— or —$NR_{11}$, wherein $R_{11}$ is hydrogen, methyl or ethyl, $R_8$ is hydrogen, methyl or ethyl, $R_9$ and $R_{10}$ are each hydrogen, methyl or ethyl.

Dyes of formula (1) are readily bleached by the sulphite in photographic processing solutions, especially in photographic silver halide developing solutions.

Examples of the most readily bleached dyes of formula (1) are dye 1 and dye 4 as hereinafter set forth.

Some of the dyes of formula (1) have been described in the patent literature as merocyanine optical sensitizing dyes. However they have not found any widespread use as such.

It is an essential feature of the photographic material of the present invention that the dyes of formula (1) should be present in the photographic material as a solid dispersion. Attempts to incorporate the dyes in coated layers by other means, for example solvent solutions coatings, have been unsuccessful on account of the very low solubility of these dyes in polar solvents such as methanol, ethanol, acetone, ethyl acetate, dichloromethane, and oils such as tricresol phosphate. Such coatings are low in density and of considerably narrower spectral coverage. Also these coatings are invariably of poor quality owing to uncontrolled precipitation of the dye in the layer. The presence of oil increases the thickness of the layer and reduces the bleachability of the dye.

Further, the dyes of formula (1) when present in coated layers as solid dispersions exhibit a greater range of useful spectral absorptions than when coated by other means.

The preferred binder for the dyes of formula (1) is gelatin, especially when the layer containing the dyes is a filter layer or an anti-halation underlayer.

A solid dispersion of the dyes of formula (1) may be prepared by forming the dyes in situ in a gelatin medium, carefully controlling the precipitation of the dye as formed. The gelatin medium containing the solid dye can then be coated as a layer in the photographic material.

Alternatively a solid dispersion of the dye may be formed in a binder by a milling technique wherein a water slurry of the dye together with a nonionic and/or an anionic wetting agent are placed together with water in a colloidal mill which is charged with grinding media of 0.7 to 1.00 mm diameter. The mill is operated until the average particle size of the dye is less than 1 μm in diameter, which is a mean size of 0.4 to 0.5 μm.

A solution of the binder medium (usually gelatin in water) together with a wetting agent is then added to the aqueous dye dispersion after removal from the mill. The required concentration of the dispersion with regard to both the dye concentration and the binder concentration can then be made.

Formulation of the dyes of formula (1) as solid dispersions enables neutral colour underlayers, which cover virtually all the actinic light range, to be prepared using one or two dyes only. Dyes of formula (1) as solid dispersions may be mixed with one another without any destabilisation of the dispersion or adverse effect on bleachability or substantivity of the dyes.

The compounds of formula (1) wherein n is 1 or 2 may be prepared by reacting a compound of the formula (5)

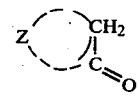

where Z has the meaning assigned to it above in a solvent medium at an elevated temperature with a compound of the formula

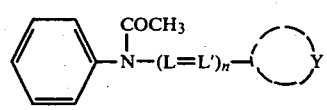

where Y, L, L' and n have the meanings assigned to them above.

Examples of suitable solvents are ethanol, acetic acid, pyridine and triethylamine.

The compounds of formula (1) wherein n is zero may be prepared by reacting a compound of formula (5) in a solvent medium at an elevated temperature with a compound of the formula

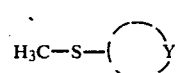

where Y has the meaning assigned to it above.

The pyridones of formula (5) can themselves be obtained by a number of methods such as are described for example in Heterocyclic Compounds—Pyridine and its derivatives—Part 3, which was edited by Klinsberg and published by Interscience Publishers in 1962. See also British Patent Spcification No. 1,256,095.

As specific examples of the hydroxypyridones there may be mentioned 2,6-dihydroxy-3-cyano-4-methylpyridine, 1-(methyl or ethyl)-3-cyano-4-methyl-6-hydroxypyrid-2-one, 1-($\beta$-hydroxyethyl or $\gamma$-methoxypropyl)-3-cyano-4-(methyl, phenyl or ethyl)-6-hydroxypyrid-2-one, 1-(phenyl or anisyl)-3-cyano-4-(methyl or phenyl)-6-hydroxypyrid-2-one, 1-phenyl-3-(carbonamido or carboethoxy)-4-(methyl or phenyl)-6-hydroxypyrid-2-one, 2,6-dihydroxy-3-(carboethoxy or carbodiethylamido)-4-methylpyridine, 2,6-dihydroxy-3-(carbonamido or carboethoxy)-pyridine, 2,6-dihydroxy-2-carbonamido-4-phenylpyridine, 2,6 1dihydroxy-3-cyano-4-carbonamidopyridine, 2,6-dihydroxy-3-cyano-4-(carbomethoxy or carboethoxy)-pyridine, ethyl-2,6-dihydroxy-3-cyanopyrid-4-ylacetate, 2,6-dihydroxy-3-cyanopyrid-4-ylacetamide, 2,6-dihydroxy-3,4-di-(carboethoxy)-pyridine, 2,6-dihydroxy-3-carbonamido-4-carboethoxypyridine, ethyl-2,6-dihydroxyisonicotinate, 2,6-dihydroxy isonicotinamide, 2,6-dihydroxyisonicotinic acid diethylamide and 2,6-dihydroxy-3-cyano-4-ethoxycarbonyl-1-methylpyridine.

The following preparations illustrate the preparation of dyes of formula (1).

Preparation 1

Dye of the formula

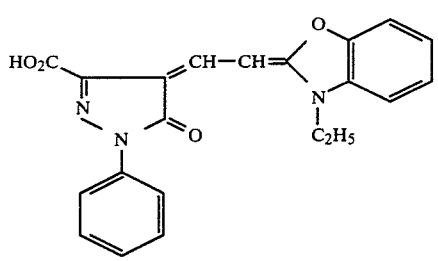
(101)

3-Carboxy-1-phenylpyrazolone (8.16 g) and 2-(2'-acetanilidovinyl)-1-ethylbenzoxazole iodide (17.36 g) were heated at reflux in acetic acid (40 ml) for 10 min. The cooled solution was drowned in water, and the precipitated dye was washed with hot water, then with a 4:1 mixture of ether and acetone. The dye was further purified by Soxhlet extraction with acetone to give 3 g of pure dye. $\lambda$ max (CH$_3$OH) = 479 nm.

Preparation 2

Dye of the formula

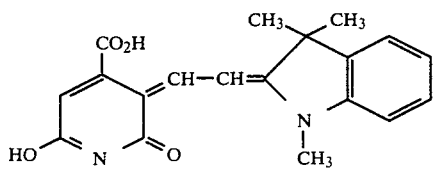
(102)

Citrazinic acid (3.88 g) and 2-(2'-acetanilidovinyl)-1,3,3-trimethylindolinium iodide (11.12 g) were heated at reflux in ethanol (20 ml) with triethylamine (5 ml) for 30 min. The cooled mixture was acidified with hydrochloric acid (4.2 ml) and the dye precipitated by drowning in ether to give a red gum. The precipitate from methanol into 1:1 ether/acetone gave a solid which was boiled with acetone, filtered, washed with acetone and dried to give 6.43 g of pure dye. $\lambda$ max (CH$_3$OH) = 506, 485 (sh).

Preparation 3

Dye of the formula

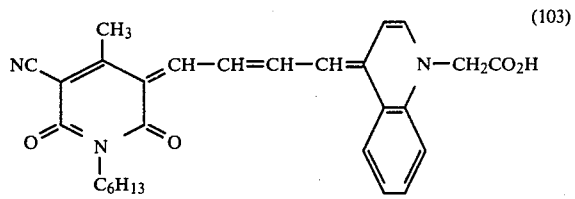
(103)

1-Carboxymethyl lepidinium chloride (2.38 g) and 3-(3'-acetanilidopropenylidene)-5-cyano-1-n-hexyl-4-methyl-pyrid-2.6-dione were heated at reflux in pyridine (9 ml) and triethylamine (1 ml) for 10 min. The cooled mixture was drowned with water, and the precipitated black oil treated with 10% hydrochloric acid (110 ml) to give a solid. This was washed with water until the washings were colourless, then boiled, firstly with 10% hydrochloric acid (55 ml), then water (3×50 ml) to give 1.77 g of pure dye. $\lambda$ max (CH$_3$OH) = 599 nm.

Preparation 4

Dye of the formula

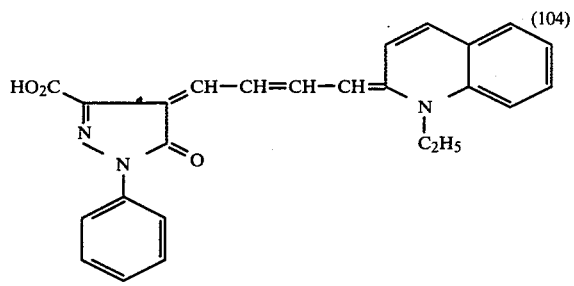
(104)

3-Carboxy-1-phenylpyrazolone (2.04 g) and 2-(4'-acetanilidobutadienyl)-1-ethylquinolinium iodide (4.7 g) were refluxed in ethanol (10 ml) with pyridine (5 ml) and triethylamine (2 ml) for 30 min. The cooled solution was drowned in ether to give a blue gum, which was taken up in methanol and acidified at 0° C. with hydrochloric acid (2 ml). Drowning this solution in water gave a brown solid (turning blue on solution in triethylamine). This was boiled with water (50 ml) to give the pure dye as a magenta solid (2.44 g). $\lambda$ max (CH$_3$OH) = 605, 520 nm.

Preparation 5

Dye of the formula

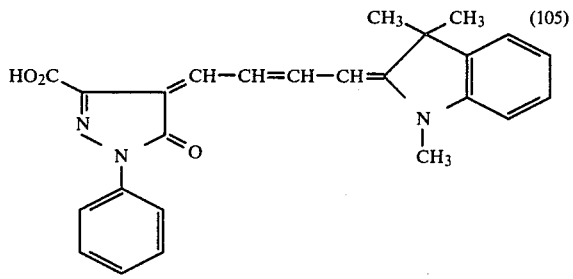
(105)

As Preparation 4, using instead 2-(4'-acetanilidobutadientyl)-1,3,3-trimethylindolinium iodide (4.72 g). The dye was obtained as an orange solid (2.8 g). λ max (CH₃OH)=538, 466, 418 nm.

EXAMPLE 10 g of the dye of formula (101) was made into a water slurry using 1.0 g of a 10% solution of the non-ionic wetting agent (octylphenol/10 moles of ethylene oxide) and 1.0 g of a 10% solution of an anionic wetting agent (adduct of octyl-methylphenol and 8 moles of ethylene oxide, sulfonated, sodium salt). The total amount of water present in the slurry was 80 g. The slurry was poured into a colloidal mill which had been charged with grinding media of 0.75 to 1.00 mm. The slurry was milled at 3000 rpm for 1 hour, after which time it had a particle size distribution of less than 1 $\mu$m in diameter.

The aqueous dispersion of the dye was removed from the mill and to it was added 2.5 kg of a 4% aqueous gelatin solution having a pH of 6.0. The gelatin used was a decationised blend. The gelatin solution was added slowly with stirring to the aqueous dispersion of the dye. This concentration in such that when the aqueous gelatin dye dispersion is coated as a layer in a panchromatically sensitised silver halide emulsion material it will produce a density of 1.0 at λ max when coated at a coating weight of 20 mg/dm² of gelatin which is a coating of 1-2 mg/dm² of dye.

This dye dispersion in aqueous gelatin solution was coated on the clear cellulose triacetate base 150 microns thick to give a coating weight of 20 mg/dm². This coating was dried and overcoated with a panchromatically sensitised silver iodobromide emulsion having a coating weight of 50 mg/dm² of silver, of 80 mg/dm² of gelatin. This layer was dried and overcoated with a gelatin solution containing 8 cm³ of 6% formaldehyde hardener solution per 100 g of gelatin, to provide a non-stress or supercoat layer with a coating weight of 12 mg/dm² of gelatin. The dyed gelatin layer thus constituted an anti-halation underlayer.

During these coating operations no dye was observed to leach out of the dyed underlayer.

Similar photographic material was prepared except that no dye was present in the gelatin underlayer. This material was used in a comparison test.

Strips of both sets of photographic material were imagewise exposed behind a wedge and processed as follows:

| | | |
|---|---|---|
| Silver halide developing solution | | |
| 6½ minutes at 20° C. | | |
| Solution: | p-N-methylaminophenol sulfate | 2 g |
| | Anhydrous sodium sulphite | 100 g |
| | Hydroquinone | 5 g |
| | Borax | 2 g |
| | Water to | 1 liter |
| Water wash bath | | |
| ½ minute at 20° C. | | |
| Silver halide fixing bath | | |
| 10 minutes at 20° C. | | |
| Solution: | Sodium thiosulphate | 300 g |
| | Anhydrous sodium sulphite | 15 g |
| | Glacial acetic acid | 10 g |
| | Boric acid | 7.5 g |
| | Potassium alum | 15 g |
| | Water to | 1 liter |
| Final water wash bath | | |
| 15 minutes at 20° C. | | |

After completion of the processing no sign of dye in the anti-halation underlayer was visible. The dye was completely and irreversibly destroyed in the silver halide developing solution and no discolouration of any of the processing solutions was visible.

The sensitometric properties of the two sets of photographic strips were compared and the speed, contrast and $D_{max}$ of the sets of strips were similar. However a marked increase in sharpness of the final image was observable in the strips which had before processing the anti-halation underlayer which comprised a solid dispersion of dye of formula (101).

Four similar sets of strips were prepared which contained in the anti-halation underlayer dyes of formulae (102) to (105) respectively. These four sets of strips were also tested together with strips which did not have an anti-halation underlayer but which were similar in all other respects. In all four sets of strips the dye in the anti-halation underlayer was completely and irreversibly bleached. In all four sets of strips the sensitometric properties of the material were assessed after processing and were all similar and also similar to the material which had no anti-halation underlayer. However the image in all four sets of strips was markedly sharper than the image in the material which did not have the dyed anti-halation underlayer.

In order to show that all five dyes of formulae (101) to (105) were entirely substantive to the gelatin underlayer gelatin dispersions of the five dyes were prepared as just described and these dispersions were coated as layers on five strips of clear cellulose triacetate base again at a gelatin coating weight of 20 mg/dm² and a dye coating weight of 1-2 mg/dm². No hardener was added in this test. The spectral absorption of each strip was measured. All five strips were immersed in separate water baths for 30 minutes at 25° C. At the end of this period they were removed and dried. No colouration of the water was observed in any of the five baths. The spectral absorption of each strip was then re-measured and in every case was found to be unaltered.

In order to show the improvement obtained in the spectral absorption the spectra of the photographic material containing a solid dispersion of dye of formula (101) and a material containing of the same dye in solution are compared. When dye of formula (101) has been dissolved in acetone the material exhibits a narrow spectral absorption between about 425 and 500 nm. However when dye of formula (101) has been formulated in the anti-halation layer as a solid dispersion the material shows a very broad spectral absorption band between 350 up to 550 nm as in the Figure.

The solid dispersion formulation was coated in a photographic assembly as an anti-halation underlayer as just described. Similar photographic material was prepared except that no dye was present in the gelatin underlayer. This material was used in a comparison test.

The sensitometric properties of both processed strips were similar, however the sharpness of the material in which dye of formula (101) had been formulated in the anti-halation layer as a solid dispersion was markedly superior.

Comparable results were obtained when using dyes of formulae (102 to (105).

We claim:
1. Photographic silver halide material which comprises in at least one layer a solid dispersion of at least one water-insoluble dye of the general formula

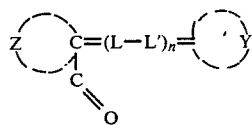

(1)

wherein L and L' each represent an optionally substituted methine group, n is 0, 1 or 2, Z represents the atoms necessary to complete an optionally substituted pyrazolone, hydroxypyridone, barbiturate, thiobarbiturate, dimedone or indan-1, 3-dione, Y represents the atoms necessary to complete an optionally substituted benzimidazole, benzoxazole, benzthiazole, benzselenazole, indole, lepidinole or quinole, at least one of the rings Z and Y being substituted by a —COOH group or being substituted by a group which comprises a —COOH group, in a binder.

2. Photographic silver halide material according to claim 1 wherein the dye of formula (1) n is 1 or 2 and both L and L' are —CH=.

3. Photographic silver halide material according to claim 1 wherein the water-insoluble dye is of the formula

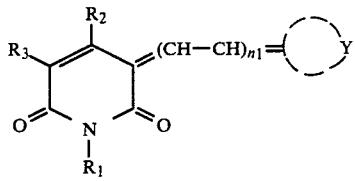

(2)

where $n_1$ is 1 or 2 and Y has the meaning assigned to it in claim 1, $R_1$ represents a hydrogen atom or an optionally substituted alkyl, aralkyl, cycloalkyl, aryl or heterocyclic radical or an optionally substituted amino group, $R_2$ represents a hydrogen atom or a hydroxy, amino, —CN, —COOR$^1$, —CONR$^1$R$^2$ or —COR$^1$ group or an optionally substituted alkyl, aralkyl, cycloalkyl, aryl or heterocyclic radical, and $R_3$ represents a hydrogen atom or a —CN, —COOR$^3$, —CONR$^3$R$^4$, —SO$_3$H, —SO$_3^-$ or —COR$^3$ group, where R$^1$, R$^2$, R$^3$ and R$^4$ each independently represent a hydrogen atom or an optionally substituted alkyl, aralkyl, cycloalkyl, aryl or heterocyclic radical and at least one of the hydroxypyridone or Y rings being substituted by a —COOH group or being substituted by a group which comprises a —COOH group.

4. Photographic silver halide material according to claim 1 wherein the water-insoluble dye is of the formula

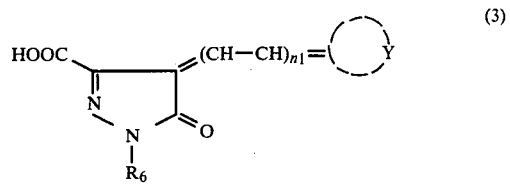

(3)

where $n_1$ is 1 or 2 and Y has the meaning assigned to it in claim 1 and $R_6$ is a hydrogen atom or an optionally substituted alkyl or aryl group.

5. Photographic silver halide material according to claim 3 wherein n is 1 and Y is a ring system of the formula

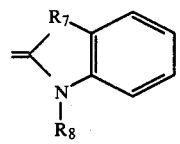

wherein $R_7$ is either —O—, —S—, —Se— or $CR_9R_{10}$ where $R_9$ and $R_{10}$ are each hydrogen atoms or lower alkyl groups, or —NR$_{11}$— where $R_{11}$ is a hydrogen atom or a lower alkyl group and $R_8$ is a hydrogen atom, a lower alkyl group or a —COOH group, there being at least one —COOH group present.

6. Photographic silver halide material according to claim 5, wherein $R_7$ is —O—, —CR$_9$R$_{10}$— or —NR$_{11}$, wherein $R_{11}$ is hydrogen, methyl or ethyl, $R_8$ is hydrogen, methyl or ethyl and $R_9$ and $R_{10}$ are each hydrogen, methyl or ethyl.

7. Photographic silver halide material according to claim 1 wherein the binder is gelatin.

8. Photographic silver halide material according to claim 1 wherein the layer which comprises the solid dispersion of the dye is an anti-halation underlayer.

* * * * *